(12) United States Patent
Choi et al.

(10) Patent No.: US 11,370,427 B2
(45) Date of Patent: Jun. 28, 2022

(54) DRIVER ASSISTANCE APPARATUS AND METHOD FOR OPERATING THE SAME

(71) Applicants: HYUNDAI MOTOR COMPANY, Seoul (KR); KIA MOTORS CORPORATION, Seoul (KR)

(72) Inventors: Sung Woo Choi, Seoul (KR); Sung Yoon Yeo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 229 days.

(21) Appl. No.: 16/536,636

(22) Filed: Aug. 9, 2019

(65) Prior Publication Data
US 2020/0189586 A1   Jun. 18, 2020

(30) Foreign Application Priority Data
Dec. 14, 2018  (KR) .......................... 10-2018-0161913

(51) Int. Cl.
*B60W 30/14*      (2006.01)
*B60W 30/18*      (2012.01)

(52) U.S. Cl.
CPC .... *B60W 30/143* (2013.01); *B60W 30/18163* (2013.01)

(58) Field of Classification Search
CPC .................................................. B60W 30/143
See application file for complete search history.

(56) References Cited

U.S. PATENT DOCUMENTS

| 6,007,451 | A  | * | 12/1999 | Matsui ................. | B60W 10/26 477/19 |
| 8,818,668 | B2 | * | 8/2014 | Ikeda .................... | B60W 10/06 701/1 |
| 2011/0288770 | A1 | * | 11/2011 | Greasby ............. | G01C 21/3697 701/532 |
| 2015/0142292 | A1 | * | 5/2015 | Kastner ................. | B60W 10/18 701/96 |
| 2016/0347324 | A1 | * | 12/2016 | Yoshitomi ............. | B60K 35/00 |
| 2016/0359345 | A1 | * | 12/2016 | Uesugi ................ | H02J 7/00047 |
| 2017/0001642 | A1 | * | 1/2017 | Kumai ................ | B60W 50/087 |
| 2018/0148063 | A1 | * | 5/2018 | Tatsushiro ...... | B60W 30/18009 |
| 2018/0265079 | A1 | * | 9/2018 | Nakada ............. | B62D 15/0285 |
| 2018/0338117 | A1 | * | 11/2018 | Park ..................... | G05D 1/0246 |
| 2019/0064756 | A1 | * | 2/2019 | Tajima ................. | G05B 19/416 |
| 2019/0138024 | A1 | * | 5/2019 | Liang ................. | G06V 20/588 |
| 2019/0291733 | A1 | * | 9/2019 | Limbacher .......... | B60W 30/143 |
| 2020/0114917 | A1 | * | 4/2020 | Oguro ................. | G05D 1/0217 |

FOREIGN PATENT DOCUMENTS

DE        102018214276 A1 *  2/2019  ............... B23G 1/16

* cited by examiner

*Primary Examiner* — Redhwan K Mawari
(74) *Attorney, Agent, or Firm* — Morgan, Lewis & Bockius LLP

(57) ABSTRACT

The present disclosure relates to a driver assistance apparatus and a method for operating the same. The driver assistance apparatus includes a navigation device that provides a guide route and road information, a detector that measures information regarding surroundings of a vehicle, and a processor that performs a deceleration control for entrance to an exit ramp, based on the information obtained through the navigation device and the detector.

18 Claims, 10 Drawing Sheets

DRIVER ASSISTANCE APPARATUS AND METHOD FOR OPERATING THE SAME

CROSS-REFERENCE TO RELATED APPLICATION

This application claims the benefit of priority to Korean Patent Application No. 10-2018-0161913, filed on Dec. 14, 2018 in the Korean Intellectual Property Office, the entire contents of which are incorporated herein by reference.

TECHNICAL FIELD

The present disclosure relates to a driver assistance apparatus for supporting entrance to a ramp during driving and a method for operating the driver assistance apparatus.

BACKGROUND

An advanced driver assistance system (ADAS) is a system for providing driving information or hazard warnings, or preventing safety accidents through active intervention, to enable a driver to drive more conveniently and safely. Examples of the ADAS include a navigation smart cruise control (NSCC), a smart cruise control (SCC), a lane departure warning system (LDWS), a lane keeping assist system (LKAS), a collision avoidance system (CAS), a driver status monitoring (DSM), and the like.

Among these systems, the NSCC automatically reduces the speed of a vehicle before entrance to a curved section of a highway or motorway to enable the vehicle to safely travel on the curved road. The NSCC operates in conjunction with a navigation terminal to control acceleration or deceleration in view of driving situations of surrounding vehicles and road curvatures.

When a route from an exit ramp (an exit link road) to another road is set on the navigation terminal, the NSCC reduces the vehicle speed from the main road without limitation to reach the curved section safety speed of the exit ramp. Therefore, when the driver wants to continue to travel on the main road without entering the exit ramp, the NSCC reduces the vehicle speed to the curved section safety speed of the exit ramp until the navigation terminal determines that the vehicle deviates from the route. In this case, the vehicle is at risk for a rear-ended collision with a rearward vehicle and may impede the traffic flow.

SUMMARY

The present disclosure has been made to solve the above-mentioned problems occurring in the prior art while advantages achieved by the prior art are maintained intact.

An aspect of the present disclosure provides a driver assistance apparatus for performing deceleration control according to a travel lane of a vehicle and the type of exit road when an exit ramp is present on a travel path of the vehicle, and a method for operating the driver assistance apparatus.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a driver assistance apparatus may include a navigation device that provides a guide route and road information, a detector that obtains information regarding surroundings of a vehicle, and a processor that performs a deceleration control for entrance to an exit ramp, based on the information obtained through the navigation device and the detector. The processor determines a travel lane of the vehicle based on the road information and the information regarding the surroundings of the vehicle, while travelling along the guide route, determines a control target point in the exit ramp on the guide route according to the determined travel lane, determines a target pre-deceleration speed based on a final target speed at the control target point, determines a control mode, depending on whether the control target point is present within a set range and whether an operating condition is satisfied, determines a required acceleration for reducing a vehicle speed to the final target speed before the vehicle reaches the control target point, and controls the entrance to the exit ramp by reducing, in advance, the vehicle speed to the target pre-deceleration speed according to the control mode and the required acceleration.

The processor may determine any one of points in the exit ramp to be the control target point, based on road curvatures for the respective points in the exit ramp and a required deceleration.

The processor may determine an exit ramp entrance speed with respect to a speed limit of a main road on which the vehicle travels, may determine a target branch-point passing speed based on the final target speed and a distance between a branch point and the control target point, and may determine the target pre-deceleration speed based on the exit ramp entrance speed and the target branch-point passing speed.

The processor may determine the target pre-deceleration speed to be the exit ramp entrance speed when the exit ramp entrance speed exceeds the target branch-point passing speed.

The processor may determine the target pre-deceleration speed to be the target branch-point passing speed when the exit ramp entrance speed is lower than or equal to the target branch-point passing speed.

The processor may determine the control mode to be a standby mode when the control target point is not located within the set range and the operating condition is satisfied.

The processor may determine the control mode to be a pre enter control mode when the control target point is located within the set range and the operating condition is satisfied.

The processor may determine the control mode to be a normal control mode when the control target point is located within the set range and the operating condition is not satisfied.

The processor may determine whether the control mode is a pre enter control mode, may determine whether deceleration control is required, based on the required acceleration when it is determined that the control mode is the pre enter control mode, may reduce, in advance, the vehicle speed to the target pre-deceleration speed when it is determined that the deceleration control is required, and may output a warning by determining whether an exit ramp entrance speed exceeds a target branch-point passing speed.

The processor may output a warning by determining whether a pre-determined required deceleration is smaller than a maximum allowable deceleration at the time of ramp curve deceleration control, when it is determined that the control mode is not the pre enter control mode.

The processor may accelerate the vehicle to the target branch-point passing speed, or may control the vehicle to travel at a constant speed, when it is determined that the control mode is the pre enter control mode and the deceleration control is not required.

According to another aspect of the present disclosure, a method for operating a driver assistance apparatus includes determining a travel lane of a vehicle while travelling along a guide route, determining a control target point in an exit ramp on the guide route according to the travel lane determination result, determining a target pre-deceleration speed based on a final target speed at the control target point, determining a control mode, depending on whether the control target point is present within a set range and whether an operating condition is satisfied, calculating a required acceleration for reducing a vehicle speed to the final target speed before the vehicle reaches the control target point, and controlling entrance to the exit ramp by reducing, in advance, the vehicle speed to the target pre-deceleration speed according to the control mode and the required acceleration.

The determining of the control target point may include determining any one of points in the exit ramp to be the control target point, based on road curvatures for the respective points in the exit ramp and a required deceleration.

The determining of the target pre-deceleration speed may include calculating an exit ramp entrance speed with respect to a speed limit of a main road on which the vehicle travels, calculating a target branch-point passing speed based on the final target speed and a distance between a branch point and the control target point, and determining the target pre-deceleration speed based on the exit ramp entrance speed and the target branch-point passing speed.

The determining of the target pre-deceleration speed may further include determining the target pre-deceleration speed to be the exit ramp entrance speed when the exit ramp entrance speed exceeds the target branch-point passing speed.

The determining of the target pre-deceleration speed may further include determining the target pre-deceleration speed to be the target branch-point passing speed when the exit ramp entrance speed is lower than or equal to the target branch-point passing speed.

The controlling of the entrance to the exit ramp may include determining whether the control mode is a pre enter control mode, determining whether deceleration control is required, based on the required acceleration when it is determined that the control mode is the pre enter control mode, reducing, in advance, the vehicle speed to the target pre-deceleration speed when it is determined that the deceleration control is required, determining whether an exit ramp entrance speed exceeds a target branch-point passing speed during the previous speed reduction, and outputting a warning when it is determined that the exit ramp entrance speed exceeds the target branch-point passing speed.

The determining of whether the control mode is the pre enter control mode may include determining whether a pre-determined required deceleration is smaller than a maximum allowable deceleration at the time of ramp curve deceleration control, when it is determined that the control mode is not the pre enter control mode and outputting a warning when it is determined that the pre-determined required deceleration is smaller than the maximum allowable deceleration.

The method may further include switching the control mode to a normal control mode when the vehicle enters an exit ramp in a pocket form and reducing the vehicle speed to the final target speed, before the determining of whether the pre-determined required deceleration is smaller than the maximum allowable deceleration.

The determining of the travel lane may further include determining that the vehicle deviates from the guide route and performing no deceleration control when it is determined that the travel lane is not the outermost lane of the main road on which the vehicle travels.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
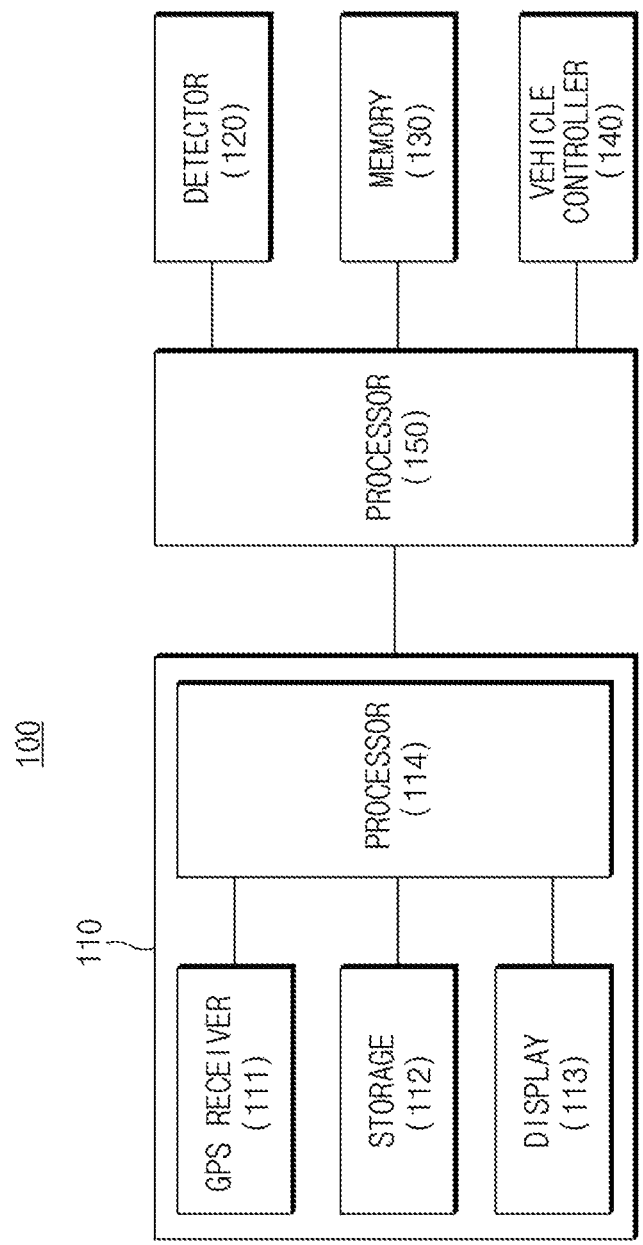
FIG. 1 is a block diagram illustrating a driver assistance apparatus according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
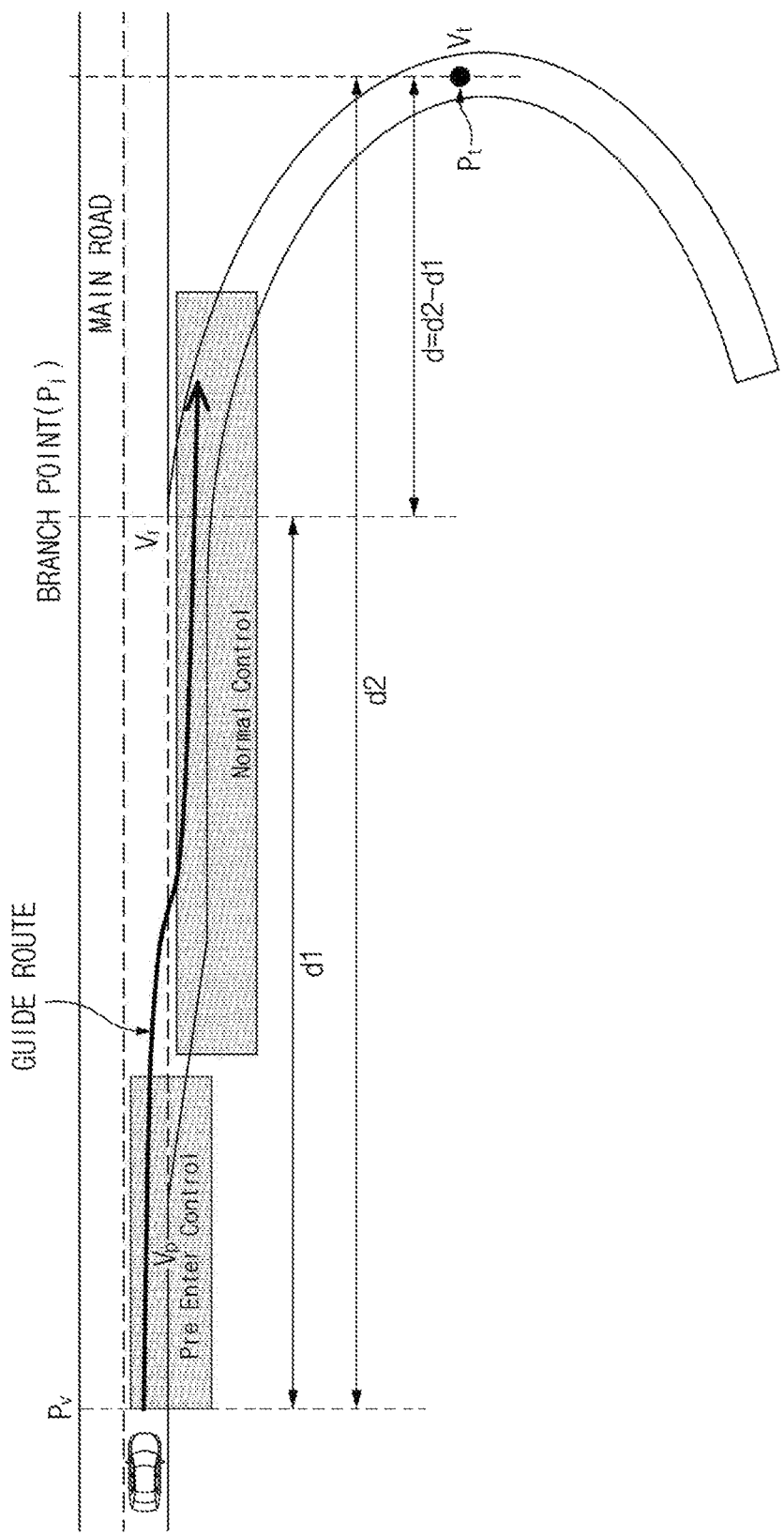
FIG. 2 is a view illustrating a method of calculating a target pre-deceleration speed according to an exemplary embodiment of the present disclosure.
Figure 3:
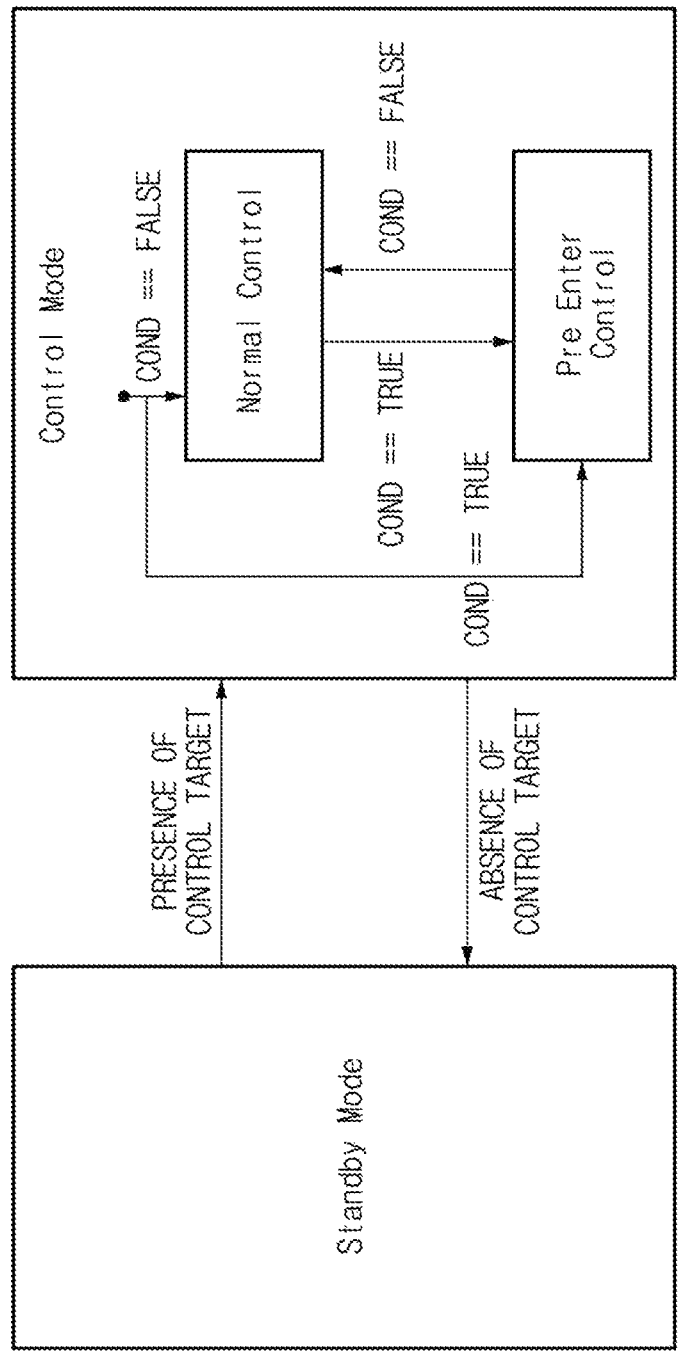
FIG. 3 is a view illustrating a method of determining a control mode according to an exemplary embodiment of the present disclosure.

FIG. 1 is a block diagram illustrating a driver assistance apparatus according to an exemplary embodiment of the present disclosure. FIG. 2 is a view illustrating a method of calculating a target pre-deceleration speed according to an exemplary embodiment of the present disclosure. FIG. 3 is a view illustrating a method of determining a control mode according to an exemplary embodiment of the present disclosure.

Referring to FIG. 1, a driver assistance apparatus 100 includes a navigation device 110, a detector 120, a memory 130, a vehicle controller 140, and a processor 150 that are connected with each other via an in-vehicle network (IVN). The driver assistance apparatus 100 is authorized for control of a vehicle by a top-level controller, when needing to assist a driver during travel of the vehicle. Here, the IVN may be implemented with a controller area network (CAN), a media oriented systems transport (MOST) network, a local interconnect network (LIN), and/or x-by-wire (Flexray).

The navigation device 110 searches for a guide route (e.g., an optimal route) from a starting point (e.g., the current position of the vehicle) to a destination and guides the vehicle to the destination along the found guide route. The navigation device 110 includes a global positioning system (GPS) receiver 111, storage 112, a display 113, and a processor 114.

The GPS receiver 111 of the navigation device 110 may obtain the current position of the vehicle. The GPS receiver 111 determines the current position of the vehicle by using satellite signals transmitted from three or more GPS satellites. Two or more GPS receivers 111 may be installed in different positions inside the vehicle.

The storage 112 of the navigation device 110 may store software programmed to cause the processor 114 to perform a predetermined operation. Furthermore, the storage 112 may store map information. The map information may include road information such as road attributes (the type of road, type of lane, and the total number of lanes), a road curvature, a road grade, a speed limit, and a branch point. The storage 112 may be implemented with at least one storage medium (recording medium) among storage media such a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, and web storage.

The display 113 of the navigation device 110 may output navigation route information with visual information. The display 113 may be implemented with, for example, at least one of a liquid crystal display (LCD), a thin film transistor-liquid crystal display (TFT LCD), an organic light-emitting diode (OLED) display, a flexible display, a three-dimensional (3D) display, a transparent display, a head-up display (HUD), a touch screen, etc.

The display 113 may include a sound output module, such as a speaker, which is capable of outputting audio data. For example, the display 113 may output an audio guidance message (an audio signal) through the speaker while displaying the navigation route information. Furthermore, the display 113 may be implemented with a touch screen combined with a touch sensor and may be used as an input device as well as an output device. A touch film or a touch pad may be used as the touch sensor.

The processor 114 of the navigation device 110 may be an electric circuitry that executes instructions of software which thereby performs various functions described hereinafter.

The processor 114 may determine an optimal route, that is, a guide route (a travel route) to a destination, based on the map information. The processor 114 may determine (generate) the guide route in view of real-time traffic condition information received from a traffic information center. The processor 114 provides directions based on the current position of the vehicle, which is obtained through the GPS receiver 111, and the determined guide route.

Furthermore, the processor 114 of the navigation device 110 may transmit the guide route and the road information to the processor 150 of the driver assistance apparatus 100. The processor 114 may transmit the data to the processor 150 by using the IVN or serial communication.

The detector 120 of the driver assistance apparatus 100 may obtain information regarding surroundings of the vehicle and state information of the vehicle (the vehicle speed, lighting of the turn signal lamp, the position of the accelerator pedal, and the position of the brake pedal) by using various types of sensors mounted in the vehicle. The detector 120 may include, for example, a speed sensor, an accelerator pedal position sensor, a brake pedal position sensor, a turn signal detection sensor, a camera, a radio detecting and ranging (RADAR), light detection and ranging (LiDAR), an ultrasonic sensor, etc.

The speed sensor may measure the current travel speed (the vehicle speed) of the vehicle. The accelerator pedal position sensor measures the degree (position) to which the accelerator pedal is depressed, and the brake pedal position sensor measures the degree (position) to which the brake pedal is depressed. The turn signal detection sensor detects whether the turn signal lamp lights up, and informs the processor 150 of the detection result.

The camera may be mounted in the vehicle to obtain images of surroundings of the vehicle. The camera may be implemented with at least one image sensor among image sensors such as an omni-directional camera, a charge coupled device (CCD) image sensor, a complementary metal oxide semi-conductor (CMOS) image sensor, a charge priming device (CPD) image sensor, and a charge injection device (CID) image sensor.

The RADAR may measure the distances between the vehicle and objects (e.g., a stationary object and a movable object). The RADAR may identify the distances from the objects and the directions and altitudes of the objects by emitting electromagnetic waves toward the objects and receiving electromagnetic waves reflected by the objects.

The LiDAR may measure the distances between the vehicle and objects. The LiDAR may identify the distances from the objects and the shapes of the objects by sending out laser pulses, measuring the arrival time of laser pulses reflected by the objects, and calculating the spatial coordinates of the reflection points.

The ultrasonic sensor may generate ultrasonic waves to detect objects around the vehicle and measure the distances between the vehicle and the objects.

The memory 130 of the driver assistance apparatus 100 may store a program for an operation of the processor 150 and may also temporarily store input/output data. The memory 130 may store a lookup table in which safety speeds according to road curvatures are defined. Furthermore, the memory 130 may store various types of setting information.

The memory 130 may be implemented with at least one storage medium among storage media such as a flash memory, a hard disk, an SD card, a RAM, an SRAM, a ROM, a PROM, an EEPROM, an EPROM, a register, a removable disk, and web storage.

The vehicle controller 140 is a controller that controls an overall operation (e.g., steering, deceleration, acceleration, and the like) of the vehicle. The vehicle controller 140 integrally controls other electronic control units in the vehicle that are connected to the vehicle controller 140 via the IVN. Here, the other electronic control units may include an engine control unit (ECU), a battery management system (BMS), electronic stability control (ESC), a traction control system (TCS), an antilock brake system (ABS), and a motor control unit (MCU).

The vehicle controller 140 includes a processor and a memory. Here, the processor may control an overall operation of the vehicle controller 140, and the memory may store a program for an operation of the vehicle controller 140, input/output data, and various types of setting information. The memory may be implemented with at least one storage medium among storage media such as a flash memory, a hard disk, an SD card, a RAM, an SRAM, a ROM, a PROM, an EEPROM, an EPROM, and a register.

The processor 150 of the driver assistance apparatus 100 may control an overall operation of the driver assistance apparatus 100. The processor 150 may include at least one of an application specific integrated circuit (ASIC), a digital signal processor (DSP), programmable logic devices (PLDs), field programmable gate arrays (FPGAs), a central processing unit (CPU), microcontrollers, and microprocessors.

The processor 150 may receive information regarding a road on a guide route from the navigation device 110 via serial communication or the IVN. Furthermore, the processor 150 obtains, from the detector 120, sensing data measured by various types of sensors.

The processor 150 may determine the lane on which the vehicle travels, based on the road information and the sensing data. For example, the processor 150 may determine the current travel lane of the vehicle by using the road attributes and the total number of lanes that are included in the road information, the type of lane, the lane color, and information about movable objects that are detected from image information, and information about stationary objects (the guardrail and the centerline) and information about movable objects (persons and surrounding vehicles) that are obtained through the RADAR, the LiDAR, and/or the ultrasonic sensor. The processor 150 may determine the travel lane of the vehicle by using a well-known travel lane determination technology.

The processor 150 may determine whether the vehicle is located on the outermost lane of the main road, based on the travel lane determination result. That is, the processor 150 determines whether the vehicle travels on the outermost lane of the main road. For example, when it is determined that the main road has four lanes and the vehicle travels on the fourth lane, the processor 150 determines that the vehicle travels on the outermost lane of the main road.

When it is determined that the vehicle travels on the outermost lane of the main road, the processor 150 determines whether an exit ramp is present in front of the vehicle on the guide route. The processor 150 determines whether an exit ramp is present within a predetermined distance (a distance of interest) ahead from the current position of the vehicle.

When it is determined that the exit ramp is present in front of the vehicle, the processor 150 identifies the type of exit road of the exit ramp with reference to the road information. An exit road is classified into a discrete exit road for which the outermost lane of a main road is used and an exit road in a pocket form that is formed in a pocket form next to the outermost lane of a main road to allow a vehicle to leave the main road therethrough.

The processor 150 may determine a control target point in the exit ramp. The processor 150 determines the control target point in view of road curvatures and required decelerations. In other words, the processor 150 determines road curvatures and required decelerations for respective points in a curved section of the exit ramp. The processor 150 determines any one of the points to be the control target point, based on the road curvatures and the required decelerations for the respective points.

For example, when the radii of curvature at points A and B are 150 m and 70 m and required decelerations at which the vehicle has to decelerate to pass through points A and B at safety speeds of 70 kph and 50 kph are −0.9 m/s² and −0.5 m/s², the processor 150 determines point A with a larger required deceleration to be the control target point although the radius of curvature at point B is larger than the radius of curvature at point A.

The processor 150 determines a safety speed at the control target point, that is, the final target speed $V_t$ required to safely pass through the control target point. The processor 150 determines the safety speed $V_t$ at the control target point with reference to the lookup table that is already stored in the memory 130 and in which safety speeds according to road curvatures are defined.

The processor 150 determines a target pre-deceleration speed $V_p$ based on the final target speed $V_t$. A method of determining the target pre-deceleration speed $V_p$ will be described in detail with reference to FIG. 2.

First, the processor 150 may determine a target branch-point passing speed $V_r$ and an exit ramp entrance speed $V_c$. The target branch-point passing speed $V_r$ is a speed from which the vehicle decelerates at a preset maximum allowable deceleration of $a_{max}$ to reach the control target point $P_t$ from the branch point $P_j$ that is the last point through which the vehicle can enter the exit ramp. The exit ramp entrance speed $V_c$ is the lowest speed to which the vehicle can decelerate while preventing a rear-end collision with a rearward vehicle on the main road without impeding the traffic flow.

The target branch-point passing speed $V_r$ may be given by Equation 1 below.

$$V_r = \sqrt{V_t^2 - 2a_{max}d} \qquad \text{[Equation 1]}$$

Here, $a_{max}$ is the maximum allowable deceleration at the time of controlling deceleration in the curved section of the exit ramp, and d is the distance between the branch point $P_j$ and the control target point $p_t$. "d" equals the distance of d2 between the vehicle position $P_v$ and the control target point $P_t$ minus the distance d1 between the vehicle position $P_v$ and the branch point $P_j$. The position information of the branch point $P_j$ and the control target point $p_t$ may be extracted from the road information.

The exit ramp entrance speed $V_c$ may be given by Equation 2 below.

$$V_c = V_{limit} \times c \qquad \text{[Equation 2]}$$

Here, $V_{limit}$ is the speed limit of the main road, and c is a preset constant smaller than 1.

The processor 150 determines the target pre-deceleration speed $V_p$ to be the exit ramp entrance speed $V_c$ when the exit ramp entrance speed $V_c$ is higher than the target branch-point passing speed $V_r$. Although the exit ramp entrance speed $V_c$ is higher than the target branch-point passing speed $V_r$, the processor 150 determines the target pre-deceleration speed $V_p$ to be the exit ramp entrance speed $V_c$ to prevent a rear-end collision with a rearward vehicle without impeding the traffic flow on the main road.

Meanwhile, the processor 150 determines the target pre-deceleration speed $V_p$ to be the target branch-point passing speed $V_r$ when the exit ramp entrance speed $V_c$ is lower than or equal to the target branch-point passing speed $V_r$. When the target branch-point passing speed $V_r$ is higher than the exit ramp entrance speed $V_c$, even though the vehicle decelerates only to the target branch-point passing speed $V_r$ rather than the exit ramp entrance speed $V_c$, the vehicle can decelerate to the safety speed (the final target speed) $V_t$ before reaching the control target point $P_t$ after entering the exit ramp. Therefore, the processor 150 determines the target pre-deceleration speed $V_p$ to be the target branch-point passing speed $V_r$.

The processor 150 may determine a control mode, depending on a presence or absence of a control target point and whether an operating condition is satisfied or not. When the following three conditions are all satisfied, the processor 150 determines that the operating condition COND is satisfied.

[Operating Conditions]
1) whether an exit road in a pocket form is present in front of the vehicle on the guide route
2) whether the vehicle travels on the outermost lane of the main road
3) whether the turn signal lamp oriented in the exit direction lights up As illustrated in FIG. 3, the control mode is classified into a standby mode, a pre enter control mode, and a normal control mode. The standby mode is a preparation mode in which a control target point (a control target) is not present within a set distance, but the operating conditions are satisfied. The pre enter control mode is a mode in which a control target point is present within the set distance, the operating conditions are all satisfied, a guide route is set in the direction toward an exit road in a pocket form, and pre-deceleration control is performed on the outermost lane of the main road. The normal control mode is a mode in which a control target point is present within the set distance, only a part of the operating conditions is satisfied, and the vehicle speed is controlled to the safety speed according to the road curvature at the control target point.

The processor 150 may determine a required acceleration (a required deceleration) in view of the current travel speed (the vehicle speed) of the vehicle, the final target speed, and the distance to the control target point. In other words, the processor 150 determines a deceleration required (necessary) for reducing the vehicle speed to the final target speed before the vehicle reaches the control target point. Here, the vehicle speed may be obtained through the detector 120, or may be received from the navigation device 110.

After calculating the required acceleration, the processor 150 controls the vehicle controller 140 to reduce the vehicle speed only to the target pre-deceleration speed $V_p$ if the determined control mode is the pre enter control mode. In the case where the target branch-point passing speed $V_r$ is lower than the exit ramp entrance speed $V_c$, the processor 150 determines the target pre-deceleration speed $V_p$ to be the exit ramp entrance speed $V_c$ and outputs a warning if the vehicle cannot decelerate at the maximum allowable deceleration $a_{max}$ or more and thus cannot reach the final target speed $V_t$ even though the vehicle decelerates at the maximum deceleration set for the driver assistance apparatus 100 after the entrance to the exit road in the pocket form. Here, the set maximum deceleration, which is the amount of braking when the brake pedal is fully depressed, is set to be a smaller value than a deceleration during braking. The processor 150 may output the warning through a warning output device separately provided for outputting a warning signal, or may output the warning through the display 113 of the navigation device 110.

The processor 150 switches the control mode to the normal control mode when the vehicle enters the exit road (the exit ramp), and reduces the vehicle speed to the final target speed $V_t$. Furthermore, the processor 150 outputs a warning when the absolute value of the required deceleration (e.g., −3 m/s$^2$) is greater than the absolute value of the maximum allowable deceleration $a_{max}$ (e.g., −2 m/s$^2$). That is, because the vehicle decelerates at the maximum deceleration set for the driver assistance apparatus 100 after the entrance to the exit ramp and therefore cannot reach the final target speed before reaching the control target point, the processor 150 outputs the warning to cause the driver to directly operate the brake pedal to perform deceleration control. When the driver operates the brake pedal, the processor 150 returns the control of the vehicle to the top-level controller.

Figure 4A:
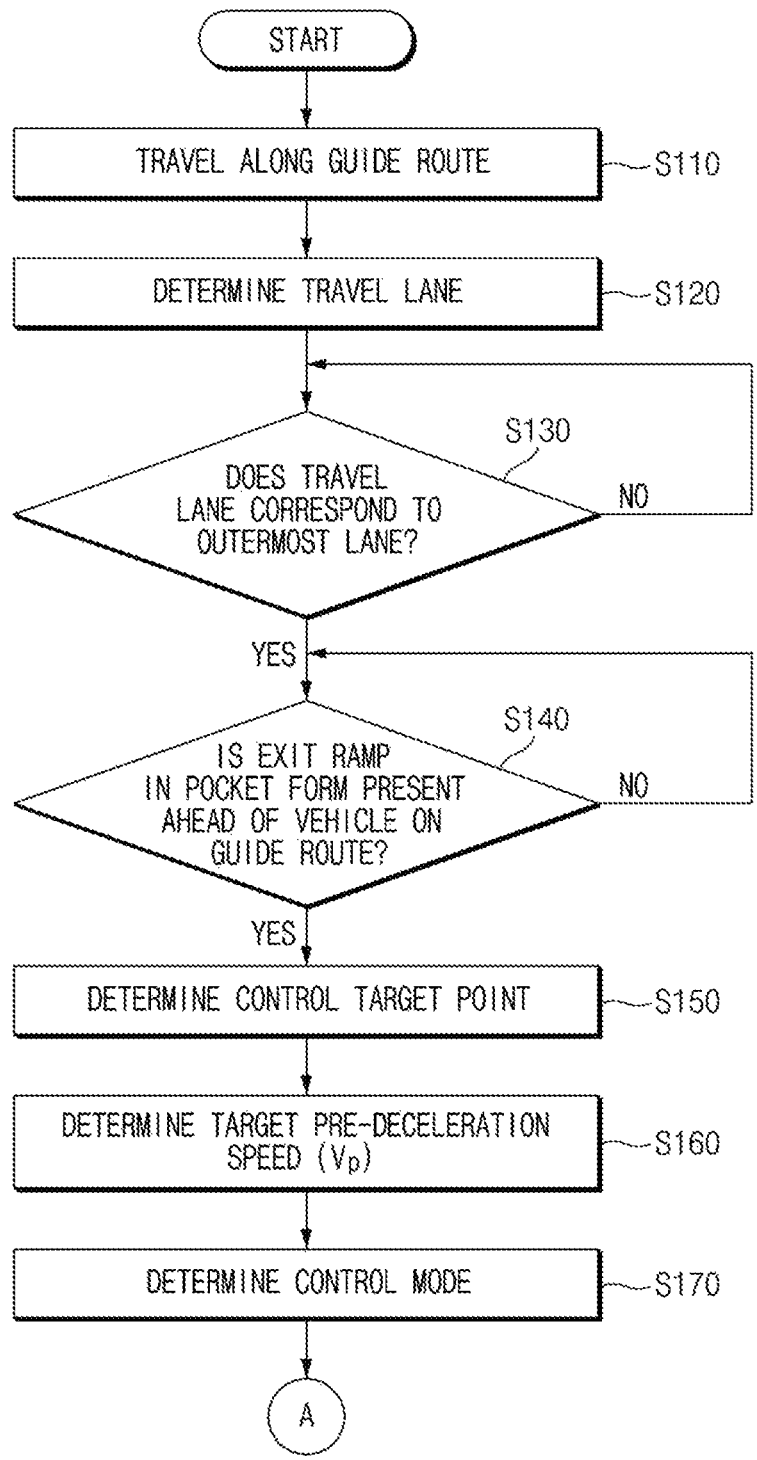
FIGS. 4A and 4B are flowcharts illustrating a method of operating the driver assistance apparatus according to an exemplary embodiment of the present disclosure.
Figure 4B:
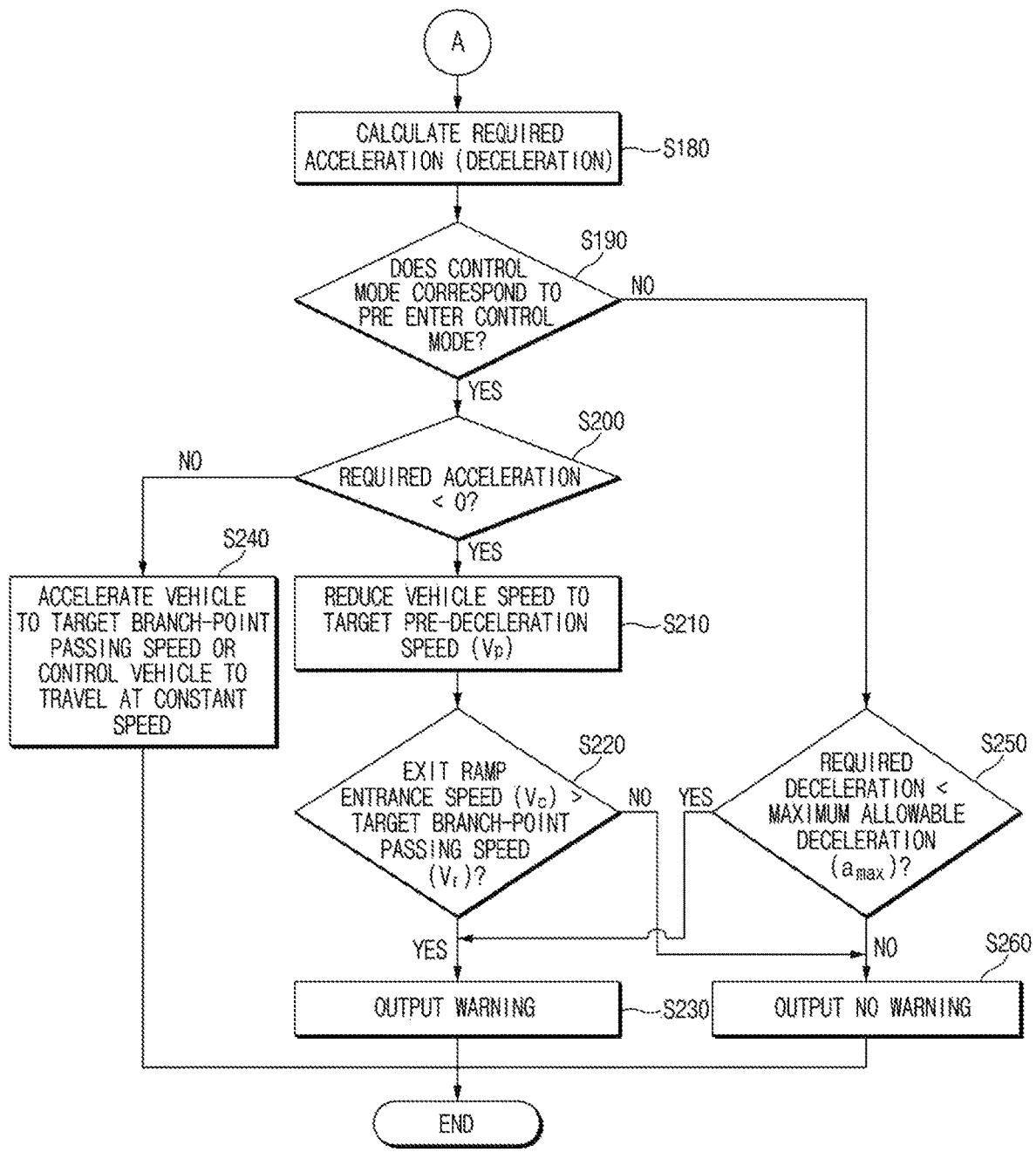

FIGS. 4A and 4B are flowcharts illustrating a method of operating the driver assistance apparatus according to an exemplary embodiment of the present disclosure.

The processor 150 of the driver assistance apparatus 100 may determine the travel lane of the vehicle (S120) while the vehicle is travelling along a guide route received from the navigation device 100 (S110). The processor 150 determines the lane on which the vehicle travels, based on road information received from the navigation device 110 and sensing data obtained through the detector 120. The processor 150 may determine the travel lane of the vehicle by using a well-known travel lane determination technology.

The processor 150 may determine whether the travel lane of the vehicle is the outermost lane of the main road (S130). In other words, the processor 150 determines whether the vehicle is located on the outermost lane of the main road.

When it is determined that the travel lane is the outermost lane of the main road, the processor 150 determines whether an exit ramp in a pocket form is present (located) in front of the vehicle on the guide route (S140). The processor 150 determines whether an exit ramp in a pocket form is included in the guide route. In other words, the processor 150 determines whether the navigation device 110 guides a route to an exit ramp in a pocket form.

When it is determined that an exit ramp in a pocket form (hereinafter, referred to as the exit ramp) is present, the processor 150 determines a control target point on the exit ramp in a pocket form (S150). The processor 150 determines a safety speed according to road curvatures for respective points with reference to the lookup table stored in the memory 130, determines a required deceleration, determines the control target point, and determines the final target speed and the required deceleration.

When the control target point is determined, the processor 150 determines a target pre-deceleration speed $V_p$, based on the final target speed at the control target point (S160). The processor 150 determines a target branch-point passing speed $V_r$ based on the final target speed and determines an exit ramp entrance speed $V_c$ for entrance to the exit ramp. The processor 150 determines the target pre-deceleration speed $V_p$ to be the exit ramp entrance speed $V_c$ when the exit ramp entrance speed $V_c$ is higher than the target branch-point passing speed $V_r$. Meanwhile, the processor 150 determines the target pre-deceleration speed $V_p$ to be the target branch-point passing speed $V_r$ when the exit ramp entrance speed $V_c$ is lower than or equal to the target branch-point passing speed $V_r$.

The processor 150 may determine a control mode, depending on a presence or absence of a control target point within a set distance from the vehicle and whether operating conditions are satisfied or not (S170). The processor 150 determines the control mode to be a standby mode when a control target point is not present within the set distance from the vehicle, but the operating conditions are satisfied. The processor 150 determines the control mode to be a pre enter control mode when a control target point is present within the set distance and the operating conditions are all satisfied, and determines the control mode to be a normal control mode when all the operating conditions are not satisfied.

After determining the control mode, the processor 150 determines a required acceleration (a required deceleration), based on the current vehicle speed, the final target speed, and the distance from the current position of the vehicle (the vehicle position) to the control target point (S180).

After calculating the required acceleration, the processor 150 determines whether the determined control mode is the pre enter control mode (S190).

When it is determined that the determined control mode is the pre enter control mode, the processor 150 determines whether deceleration control is required (S200). In other words, the processor 150 determines whether the determined required acceleration is smaller than 0.

When it is determined that the deceleration control is required, the processor 150 reduces the vehicle speed to the target pre-deceleration speed $V_p$ (S210). The processor 150 controls the vehicle controller 140 to perform the deceleration control on the vehicle.

While controlling the deceleration of the vehicle, the processor 150 determines whether the exit ramp entrance speed $V_c$ exceeds the target branch-point passing speed $V_r$ (S220). In this embodiment, for ease of understanding, it is exemplified that the processor 150 compares the exit ramp entrance speed $V_c$ and the target branch-point passing speed $V_r$ while controlling the deceleration of the vehicle. However, the processor 150 may compare the exit ramp entrance speed $V_c$ and the target branch-point passing speed $V_r$ at the same time that the target pre-deceleration speed $V_p$ is determined.

The processor 150 may output a warning (S230) when the exit ramp entrance speed $V_c$ exceeds the target branch-point passing speed $V_r$. Meanwhile, the processor 150 outputs no warning (S260) when the exit ramp entrance speed $V_c$ is lower than or equal to the target branch-point passing speed $V_r$.

When it is determined in S200 that the required acceleration is greater than or equal to 0, the processor 150 accelerates the vehicle to the target branch-point passing speed $V_r$ or performs constant speed control (S240). In other words, when the vehicle speed is lower than the target branch-point passing speed $V_r$, the processor 150 accelerates the vehicle to the target branch-point passing speed $V_r$. Meanwhile, when it is determined that the vehicle is travelling at the target branch-point passing speed $V_r$, the processor 150 performs constant speed control to cause the vehicle to maintain the current vehicle speed.

When the control mode determined in S190 is the normal control mode rather than the pre enter control mode, the processor 150 determines whether the determined required deceleration is smaller than the maximum allowable deceleration $a_{max}$ (S250). The processor 150 switches the control mode to the normal control mode when the vehicle enters the exit ramp, and reduces the vehicle speed to the final target speed $V_t$. The processor 150 outputs a warning when the required deceleration is smaller than the maximum allowable deceleration $a_{max}$ (S230). Meanwhile, the processor 150 outputs no warning when the required deceleration is greater than or equal to the maximum allowable deceleration $a_{max}$ (S260).

FIGS. 5 to 8 are views illustrating examples of operating the driver assistance apparatus according to various exemplary embodiments of the present disclosure.

First, operations of the driver assistance apparatus 100 when the vehicle enters an exit ramp having an exit road in a pocket form along a guide route will be described with reference to FIGS. 5 and 6.

Figure 5:
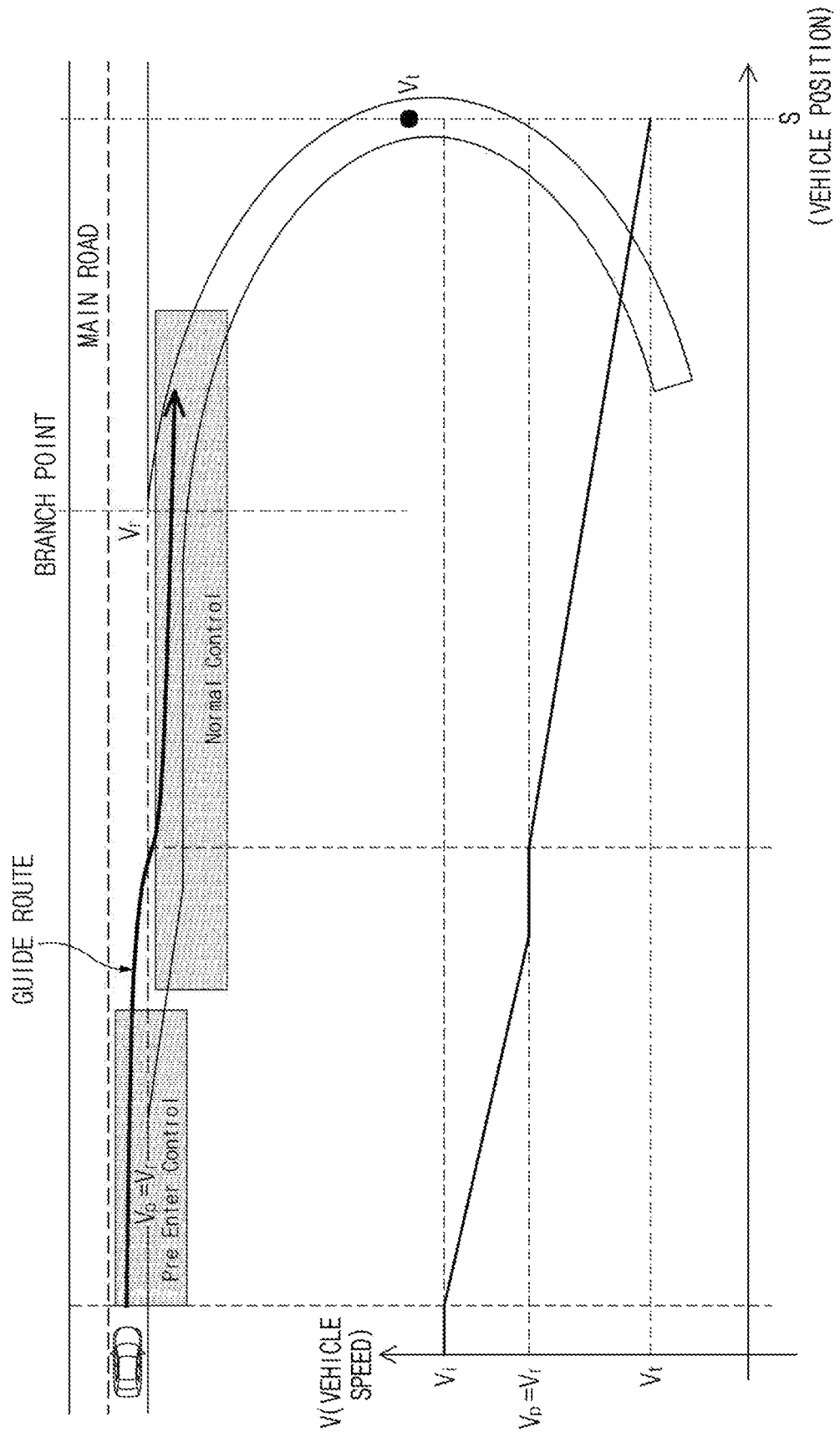
FIGS. 5 to 8 are views illustrating examples of operating the driver assistance apparatus according to various exemplary embodiments of the present disclosure.

Referring to FIG. 5, when a target branch-point passing speed $V_r$ exceeds an exit ramp entrance speed $V_c$, the processor 150 sets a target pre-deceleration speed $V_p$ to the target branch-point passing speed $V_r$. The processor 150, when entering the pre enter control mode, reduces, in advance, the vehicle speed $V_i$ to the target pre-deceleration speed $V_p$ ($=V_r$) before the vehicle enters the exit ramp. In the case where the reduced-in-advance vehicle speed is lower than or equal to the target branch-point passing speed $V_r$, the processor 150 reduces the vehicle speed $V_i$ ($=V_p=V_r$) to the final target speed $V_t$ when the vehicle enters the exit ramp. As described above, the processor 150 performs the pre-deceleration control on the vehicle speed at the time of the entrance to the exit ramp to reduce the vehicle speed to the final target speed immediately after the vehicle enters the exit ramp, thereby enabling the vehicle to safely travel on a curved section of the exit ramp.

Figure 6:
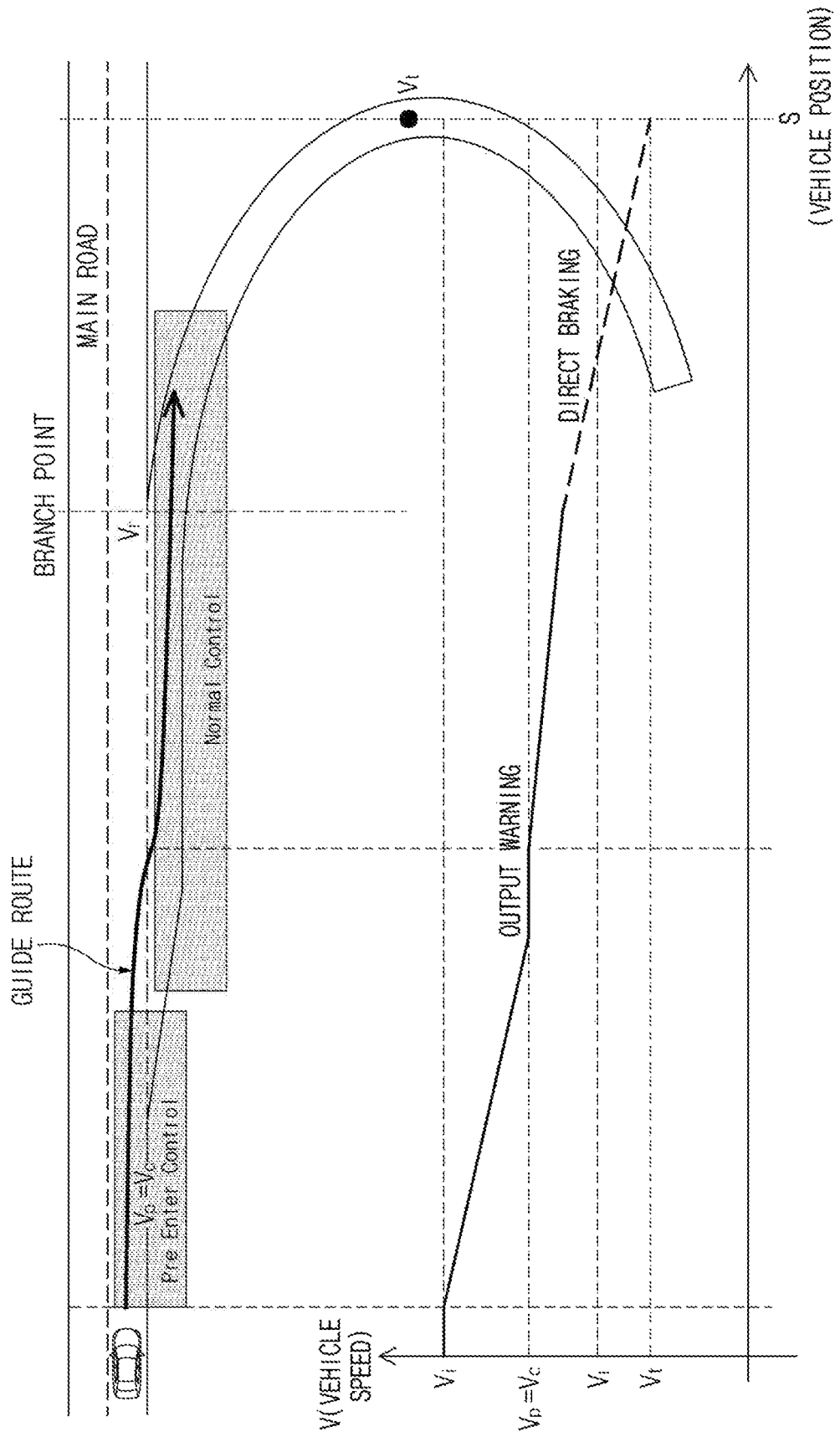

Referring to FIG. 6, when the exit ramp entrance speed $V_c$ exceeds the target branch-point passing speed $V_r$, the processor 150 may set the target pre-deceleration speed $V_p$ to the exit ramp entrance speed $V_c$. The processor 150, when entering the pre enter control mode, reduces, in advance, the vehicle speed $V_i$ to the target pre-deceleration speed $V_p$ ($=V_c$) before the vehicle enters the exit ramp. Thereafter, when the exit ramp entrance speed $V_c$ is higher than the target branch-point passing speed $V_r$, the processor 150 outputs a warning signal to lead the vehicle to rapidly enter the exit ramp.

Furthermore, the processor 150 may determine a required deceleration necessary for reducing the vehicle speed to the final target speed $V_t$ until the vehicle reaches a control target point after the entrance to the exit ramp. The processor 150 switches the control mode to the normal control mode when the vehicle enters the exit ramp, and reduces the vehicle speed to the final target speed $V_t$. When the required deceleration is smaller than the maximum allowable deceleration $a_{max}$, the processor 150 outputs a warning signal to lead the driver to directly operate the brake pedal to adjust the amount of braking.

Figure 7:
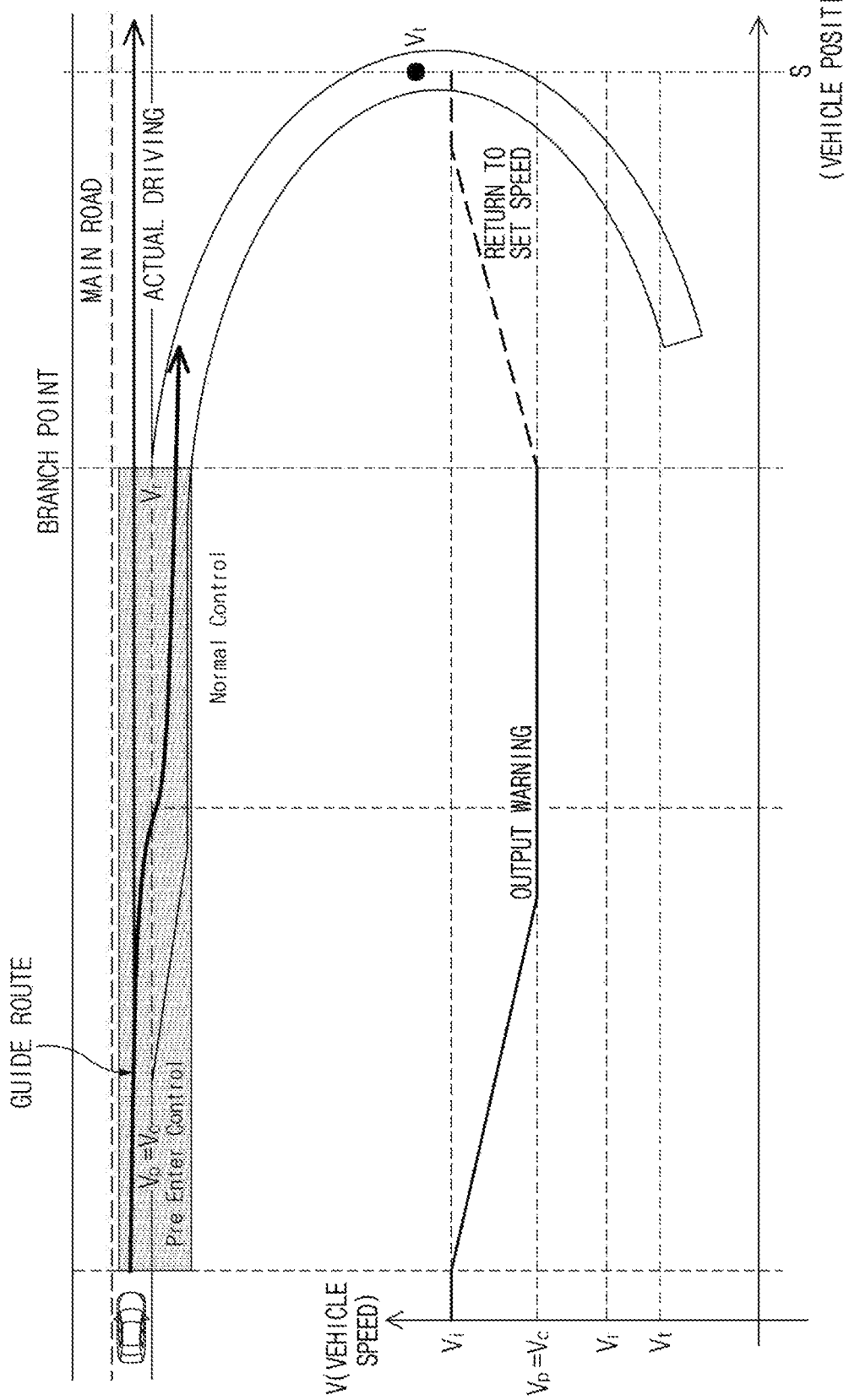

Next, operations of the driver assistance apparatus 100 when the vehicle configured to enter the exit ramp on the guide route travels on the outermost lane of the main road will be described with reference to FIG. 7.

When the exit ramp entrance speed $V_c$ exceeds the target branch-point passing speed $V_r$, the processor 150 may set the target pre-deceleration speed $V_p$ to the exit ramp entrance speed $V_c$. The processor 150, when entering the pre enter control mode, reduces, in advance, the vehicle speed $V_i$ to the target pre-deceleration speed $V_p$ ($=V_c$) before the vehicle enters the exit ramp. Thereafter, the processor 150 outputs a warning signal to lead the vehicle to rapidly enter the exit ramp because the exit ramp entrance speed $V_c$ during the pre-deceleration control is higher than the target branch-point passing speed $V_r$.

However, when the vehicle continues to travel on the main road after passing the branch point, the processor 150 may determine that the vehicle deviates from the guide route, stops outputting the warning signal, and returns the vehicle speed to the set speed $V_i$ of the vehicle. That is, the processor 150 performs acceleration control until the vehicle speed reduced to the exit ramp entrance speed $V_c$ reaches the set speed $V_i$.

Figure 8:
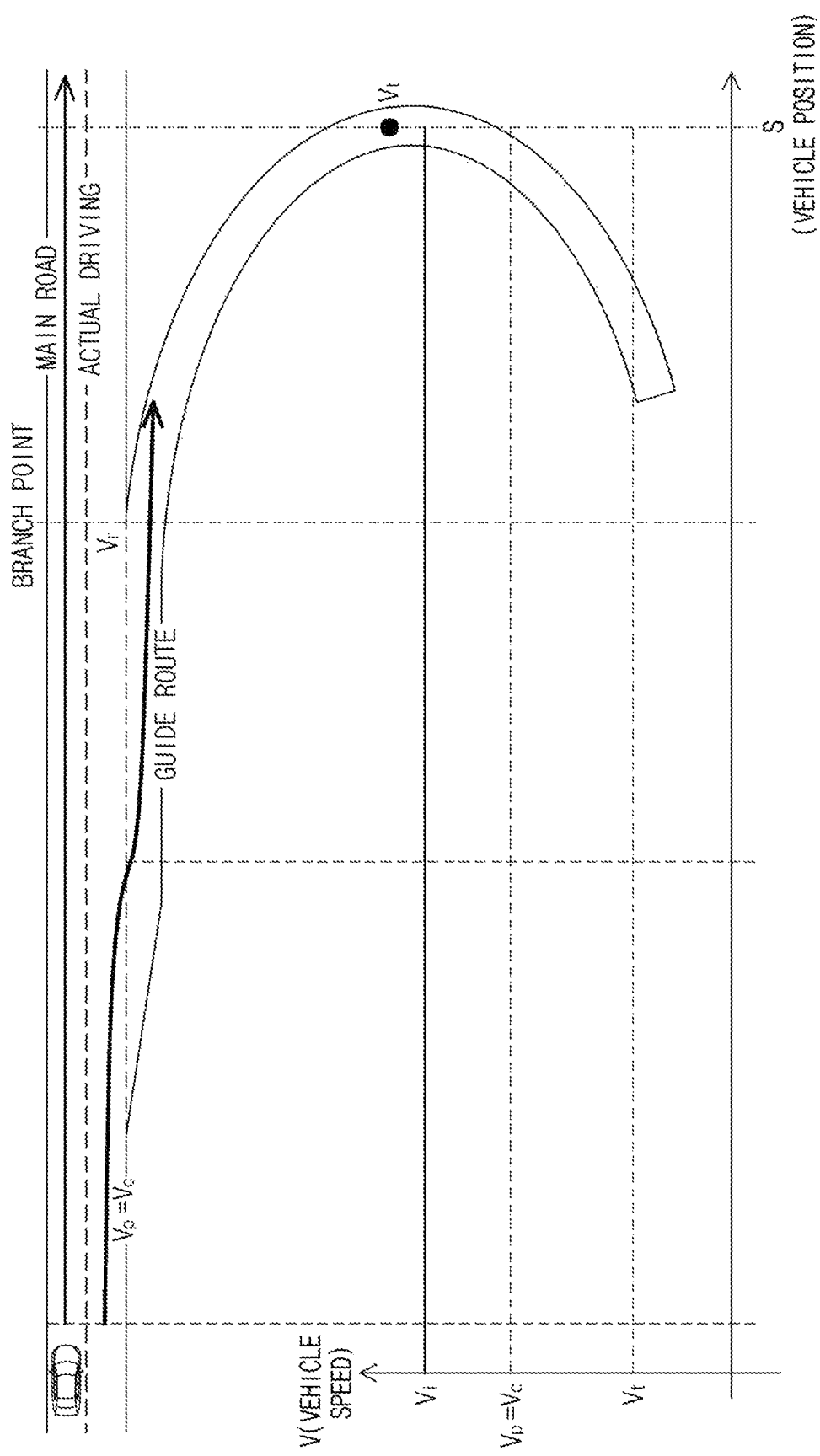

Next, operations of the driver assistance apparatus 100 when the vehicle configured to enter the exit ramp on the guide route travels on a lane other than the outermost lane of the main road will be described with reference to FIG. 8.

When the vehicle does not travel on the outermost lane of the main road although configured to enter the exit ramp on the guide route, the processor 150 of the driver assistance apparatus 100 determines that the vehicle deviates from the guide route, and does not perform deceleration control. That is, the processor 150 controls the vehicle to continue to travel at the set speed $V_i$.

Although it has been described in the above exemplary embodiments that the exit ramp is located in the outermost position of the main road, the present disclosure is not limited thereto and is applicable to a case where an exit ramp is located in the innermost position of a road.

Figure 9:
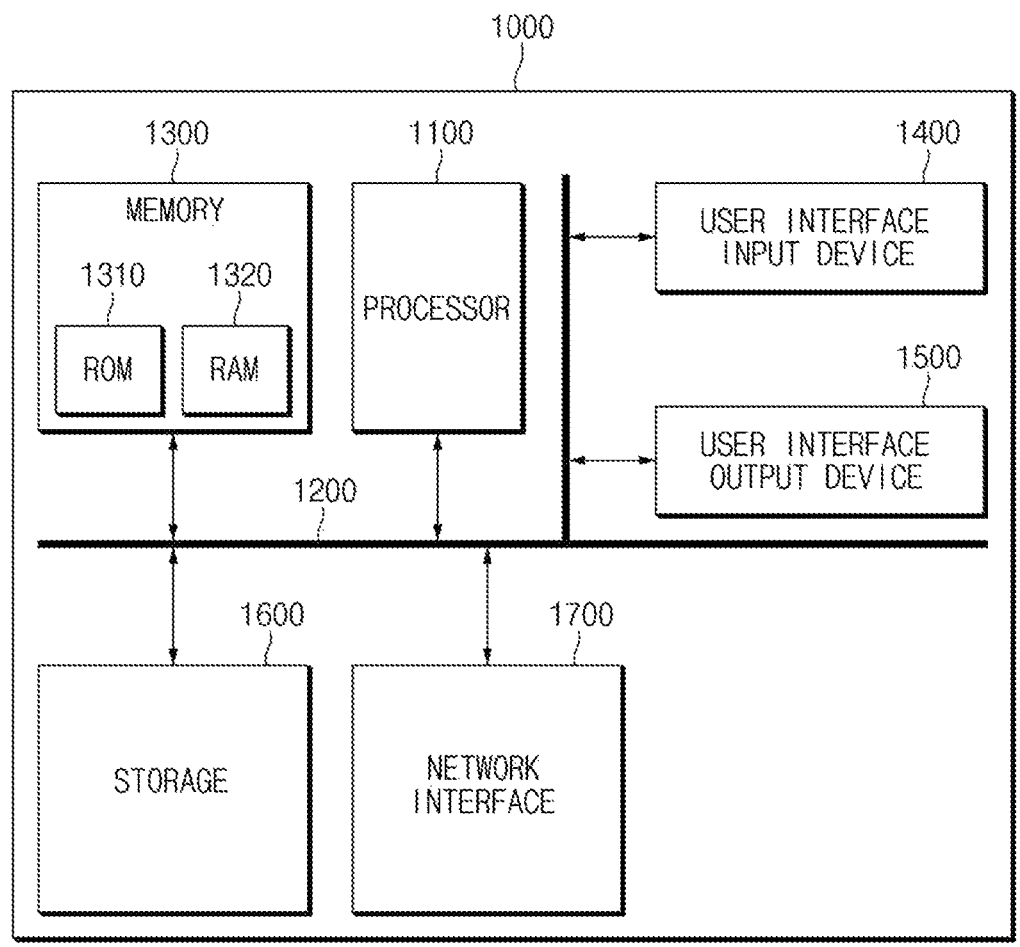
FIG. 9 is a block diagram illustrating a computing system for executing a method of operating the driver assistance apparatus according to an exemplary embodiment of the present disclosure.

FIG. 9 is a block diagram illustrating a computing system for executing a method of operating the driver assistance apparatus according to an exemplary embodiment of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the present disclosure, when an exit ramp is present on a travel path of a vehicle, the driver assistance apparatus performs deceleration control according to a travel lane of the vehicle and the type of exit road, thereby preventing a rear-end collision with a rearward vehicle due to sudden deceleration for entrance to the exit ramp, and enabling the vehicle to enter the exit ramp without impeding the traffic flow.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A driver assistance apparatus comprising:
   a navigation device configured to provide a guide route and road information;
   a detector configured to obtain information regarding surroundings of a vehicle; and
   a processor configured to perform a deceleration control for entrance to an exit ramp, based on the information obtained through the navigation device and the detector,
   wherein the processor performs the deceleration control by
   determining a travel lane of the vehicle based on the road information and the information regarding the surroundings of the vehicle, while travelling along the guide route,
   determining a control target point in the exit ramp on the guide route according to the determined travel lane,
   determining a target pre-deceleration speed based on a final target speed at the control target point,
   determining a control mode depending on whether the control target point is present within a set range and whether an operating condition is satisfied,
   determining a required acceleration for reducing a vehicle speed to the final target speed before the vehicle reaches the control target point, and
   controlling the entrance to the exit ramp by reducing, in advance, the vehicle speed to the target pre-deceleration speed according to the control mode and the required acceleration, and
   wherein the processor determines an exit ramp entrance speed with respect to a speed limit of the main road on which the vehicle travels, determines a target branch-point passing speed based on the final target speed and a distance between a branch point and the control target point, and determines the target pre-deceleration speed based on the exit ramp entrance speed and the target branch-point passing speed.

2. The driver assistance apparatus of claim 1, wherein the processor determines any one of points in the exit ramp to be the control target point, based on road curvatures for the respective points in the exit ramp and a required deceleration.

3. The driver assistance apparatus of claim 1, wherein the processor determines the target pre-deceleration speed to be the exit ramp entrance speed when the exit ramp entrance speed exceeds the target branch-point passing speed.

4. The driver assistance apparatus of claim 1, wherein the processor determines the target pre-deceleration speed to be the target branch-point passing speed when the exit ramp entrance speed is lower than or equal to the target branch-point passing speed.

5. The driver assistance apparatus of claim 1, wherein the processor determines the control mode to be a standby mode when the control target point is not located within the set range and the operating condition is satisfied.

6. The driver assistance apparatus of claim 1, wherein the processor determines the control mode to be a pre enter control mode when the control target point is located within the set range and the operating condition is satisfied.

7. The driver assistance apparatus of claim 1, wherein the processor determines the control mode to be a normal control mode when the control target point is located within the set range and the operating condition is not satisfied.

8. The driver assistance apparatus of claim 1, wherein the processor determines whether the control mode is a pre enter control mode, determines whether the deceleration control is required, based on the required acceleration when it is determined that the control mode is the pre enter control mode, reduces, in advance, the vehicle speed to the target pre-deceleration speed when it is determined that the deceleration control is required, and outputs a warning by determining whether an exit ramp entrance speed exceeds a target branch-point passing speed.

9. The driver assistance apparatus of claim 8, wherein the processor outputs a warning by determining whether a pre-determined required deceleration is smaller than a maximum allowable deceleration at the time of ramp curve deceleration control, when it is determined that the control mode is not the pre enter control mode.

10. The driver assistance apparatus of claim 8, wherein the processor accelerates the vehicle to the target branch-point passing speed, or controls the vehicle to travel at a constant speed, when it is determined that the control mode is the pre enter control mode and the deceleration control is not required.

11. A method for operating a driver assistance apparatus, the method comprising steps of:
  determining a travel lane of a vehicle while travelling along a guide route;
  determining a control target point in an exit ramp on the guide route according to the travel lane determination result;
  determining a target pre-deceleration speed based on a final target speed at the control target point;
  determining a control mode, depending on whether the control target point is present within a set range and whether an operating condition is satisfied;
  calculating a required acceleration for reducing a vehicle speed to the final target speed before the vehicle reaches the control target point; and
  controlling entrance to the exit ramp by reducing, in advance, the vehicle speed to the target pre-deceleration speed according to the control mode and the required acceleration,
  wherein the step of determining a target pre-deceleration speed includes:
  calculating an exit ramp entrance speed with respect to a speed limit of the main road on which the vehicle travels;
  calculating a target branch-point passing speed based on the final target speed and a distance between a branch point and the control target point; and
  determining the target pre-deceleration speed based on the exit ramp entrance speed and the target branch-point passing speed.

12. The method of claim 11, wherein the step of determining a control target point includes:
  determining any one of points in the exit ramp to be the control target point, based on road curvatures for the respective points in the exit ramp and a required deceleration.

13. The method of claim 11, wherein the step of determining a target pre-deceleration speed further includes:
  determining the target pre-deceleration speed to be the exit ramp entrance speed when the exit ramp entrance speed exceeds the target branch-point passing speed.

14. The method of claim 11, wherein the step of determining a target pre-deceleration speed further includes:
  determining the target pre-deceleration speed to be the target branch-point passing speed when the exit ramp entrance speed is lower than or equal to the target branch-point passing speed.

15. The method of claim 11, wherein the step of controlling entrance to the exit ramp includes:
  determining whether the control mode is a pre enter control mode;
  determining whether a deceleration control is required, based on the required acceleration when it is determined that the control mode is the pre enter control mode;
  reducing, in advance, the vehicle speed to the target pre-deceleration speed when it is determined that the deceleration control is required;
  determining whether an exit ramp entrance speed exceeds a target branch-point passing speed during the previous speed reduction; and
  outputting a warning when it is determined that the exit ramp entrance speed exceeds the target branch-point passing speed.

16. The method of claim 15, wherein the determining of whether the control mode is a pre enter control mode includes:
  determining whether a pre-determined required deceleration is smaller than a maximum allowable deceleration at the time of ramp curve deceleration control, when it is determined that the control mode is not the pre enter control mode; and
  outputting a warning when it is determined that the pre-determined required deceleration is smaller than the maximum allowable deceleration.

17. The method of claim 16, further comprising:
  switching the control mode to a normal control mode when the vehicle enters an exit ramp in a pocket form and reducing the vehicle speed to the final target speed, before the determining of whether the pre-determined required deceleration is smaller than the maximum allowable deceleration.

18. The method of claim 11, wherein the step of determining a travel lane includes:
  determining that the vehicle deviates from the guide route and performing no deceleration control when it is determined that the travel lane is not the outermost lane of the main road on which the vehicle travels.

* * * * *